US009876703B1

(12) United States Patent
Arllen et al.

(10) Patent No.: US 9,876,703 B1
(45) Date of Patent: Jan. 23, 2018

(54) COMPUTING RESOURCE TESTING

(71) Applicant: Amazon Technologies, Inc., Seattle, WA (US)

(72) Inventors: Christian Arthur Arllen, McLean, VA (US); Christopher Albert Gorski, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 440 days.

(21) Appl. No.: 14/574,263

(22) Filed: Dec. 17, 2014

(51) Int. Cl.
*G06F 15/173* (2006.01)
*H04L 12/26* (2006.01)
*H04L 12/24* (2006.01)

(52) U.S. Cl.
CPC ............. *H04L 43/50* (2013.01); *H04L 41/22* (2013.01); *H04L 41/50* (2013.01)

(58) Field of Classification Search
CPC ............. G06F 11/3428; G06F 11/3692; G06F 2209/508; G06F 11/301; G06F 11/3409; G06F 11/3668; G06F 11/3684; G06F 11/3688; H04L 41/145; H04L 43/50
See application file for complete search history.

(56) References Cited

U.S. PATENT DOCUMENTS

| | | | | |
|---|---|---|---|---|
| 8,639,824 B1 * | 1/2014 | Basu | ................. | G06F 9/468 709/229 |
| 2008/0208931 A1 * | 8/2008 | Van Riel | ............... | G06Q 30/02 |
| 2009/0281770 A1 * | 11/2009 | Yatko | .................. | G06F 9/5044 702/186 |
| 2012/0059919 A1 * | 3/2012 | Glaser | ................ | G06F 11/3672 709/223 |
| 2013/0219217 A1 * | 8/2013 | Seren | ................. | G06F 11/3664 714/27 |
| 2014/0351394 A1 * | 11/2014 | Elisha | ................. | H04L 41/0806 709/222 |
| 2014/0380281 A1 * | 12/2014 | McLaughlin | ....... | G06F 11/3688 717/127 |
| 2015/0019707 A1 * | 1/2015 | Raghunathan | .......... | H04L 43/06 709/224 |

* cited by examiner

*Primary Examiner* — Shean Tokuta
(74) *Attorney, Agent, or Firm* — Thorpe North & Western, LLP.

(57) ABSTRACT

A technology for testing a computing resource is provided. In one example, services available for the computing resource are identified. The services may be automatically tested on the computing resource and metrics for testing of the services may be collected. Performance of the services may be determined based on the metrics.

18 Claims, 8 Drawing Sheets

COMPUTING RESOURCE TESTING

BACKGROUND

Applications and computing services are often made available over the Internet or other computer networks. Content providers, application providers, and/or computing service providers often utilize remote computing services to provide access to electronic resources, such as internet services. Electronic resources may include processing services, memory services, storage services, networking services and generally any computing services supported by a hardware substrate that is used in a computing environment. Often hardware and/or software used to support the desired services are dynamically scalable to meet the changing load for the services at any given time. Users, for example, may rent, lease, or otherwise pay for access to networked computing resources and computing services, and thus reduce the burden of providing local hardware and/or software for computing services, as compared with implementations without network accessible computing services.

To facilitate increased utilization of network accessible computing resources provided via a data center, virtualization technologies can allow a single physical computing machine to host one or more instances of virtual machines that appear and operate as independent machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. As the scale and scope of data centers has increased, the task of provisioning, administering, and monitoring the physical and virtual computing resources of the data center has become increasingly complicated.

DETAILED DESCRIPTION

A technology for testing a computing resource is provided. The present technology enables testing of computing resources in a virtualized computing service environment to discover potential issues and then flagging the issues for review or correction. Specifically, testing of computing resources may be performed without relying on customers to use the computing resources or test different applications or configurations. For example, a test group of computing instances may be used to test features offered by the service provider in a particular region. The test group may be used to test services, including how the services interact or depend from one another, and the test group may be used to test whether the services function properly. In one example, the present technology may be used to ensure that any particular region functions as well as other regions, at least within a predetermined allowable degree of error or difference.

A computing instance may be one computing resource in a virtualized computing service environment that may be tested or used for testing. Other example computing resources will be described later. In one example, services and operations available for the computing resource are identified. The services and operations may be automatically implemented or executed and tested on the computing resource. Metrics for implementation and testing of the services and operations may be collected. Performance of the services and operations may be determined based on the metrics. The computing resource may be tested using various configurations or various configurations of service accounts. The service accounts may be production accounts or test customer accounts. Performance may be determined to be acceptable or not based on performance relative to other computing resources, particularly including computing resources in different geographical or service provider environment regions.

Figure 1A:
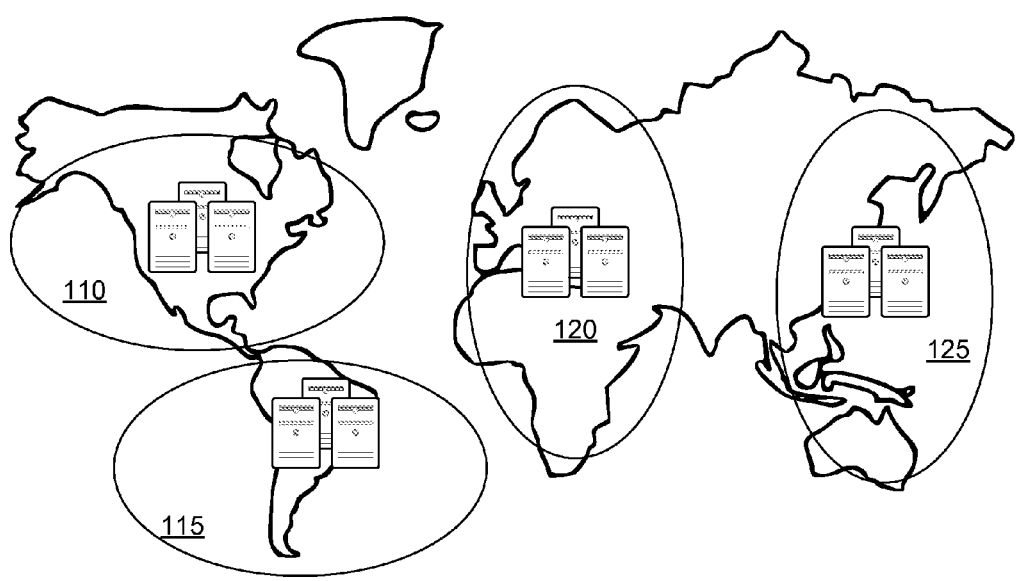
FIGS. 1A-1B illustrate testing of computing resources in different geographic regions in accordance with an example of the present technology.

FIG. 1A illustrates an example service provider environment for providing virtual computing services throughout the world, including data centers having computing resources for providing the virtual computing services at various distributed geographic regions 110-125 or locations.

A service provider may provide virtualized services in many geographic regions throughout the world. Computing instances, application or services that are launched in each region have historically been configured and initiated through a manual process. There has not been a simple method with minimal steps to install hardware, install software, and get web services started up and running. Additionally, once the services are running, various issues may be encountered due to system configurations, available resources for the services, and a variety of other factors. Customers using the services may be using the services for a wide variety of different use cases. Testing computing resources to ensure proper execution of services for different use cases may be challenging. As a result, many efforts at correcting issues within a computing service provider environment are reactive to identify problems encountered by customers in order to find a solution. When a large number of customers are utilizing the computing resources in a variety of use cases, issues are more readily detected because the issues are encountered by some customers. However, when computing resources are installed in a new region, or when an existing region has minimal activity, issues may arise with new hardware or software that are not easily identified. The present technology enables testing of computing resources to discover potential issues and flag the issues for review or correction. Specifically, testing of computing resources may be performed without reliance on customers to use the computing resources or to test different applications or configurations. The technology provides testing of services in different regions automatically and using accounts with varied configurations to test the services using different permutations of accounts. Performance may be evaluated based on metrics collected during the test to determine whether to flag services in the region for investigation to correct any issues.

As used herein "virtual computing" may refer to the use of computing services (hardware and/or software) which may be available at a remote location from the users of the computing services and the virtual computing services may be accessible over a network, such as the Internet. Users may be able to buy these computing services (including storage, computing power, networking and applications) as a utility on demand and sometimes by the hour. Use of virtual computing services can provide a number of advantages including cost advantages and/or the ability to adapt rapidly to changing computing service needs.

The service provider environment may be a multi-tenant service provider environment, such as a "cloud" environment for example. The service provider environment may include an execution environment or computing instances that includes an application software stack for the user's program or application together with one or more infrastructure services for executing the user's program on the compute service. The virtualization environment or computing instance may include a user-selectable operating system (e.g., Linux, Windows, etc.), application server (e.g., Apache Tomcat), system or application configuration, etc. The virtualization environment can be configured to be accessed at a specific URL. The infrastructure services can include, but are not limited to: a load balancer to distribute workload across the requested computing services, a load scaler to scale computing services in response to load or demand variations, a firewall or other service to control access to the computing services, a monitoring interface that permits the user to monitor execution of applications, data storage resources (e.g., scalable volume block storage), and so forth. In some configurations, the user may be able to select one or more services that may be accessed in the virtualization infrastructure. For example, the user may be able to select from a plurality of database models (e.g., a relational database, SQL database, NoSQL database, a proprietary vendor database, etc.). In some arrangements, the infrastructure services can be customized to the user rather than being a shared resource among a plurality of users. For example, in some such embodiments, the load balancer can be individually customized to the user's application rather than being shared or distributed among a number of users of the computing service provider.

The service provider environment may be capable of delivery of computing and storage capacity, as well as other computing services, as a service to a community of end recipients. In an example implementation, the service provider environment may be established for an organization (i.e., a "customer") by or on behalf of the organization. That is, the service provider may offer a "virtual private cloud environment."

In one example, a service provider environment may include any number of server computers for a compute service. The server computers may provide computing services for executing software or computing instances, which may also be referred to as virtual machines. A virtual machine may generally be an instance of a software implementation of a machine (i.e. a computer) that executes computer code like a physical machine.

Figure 1B:
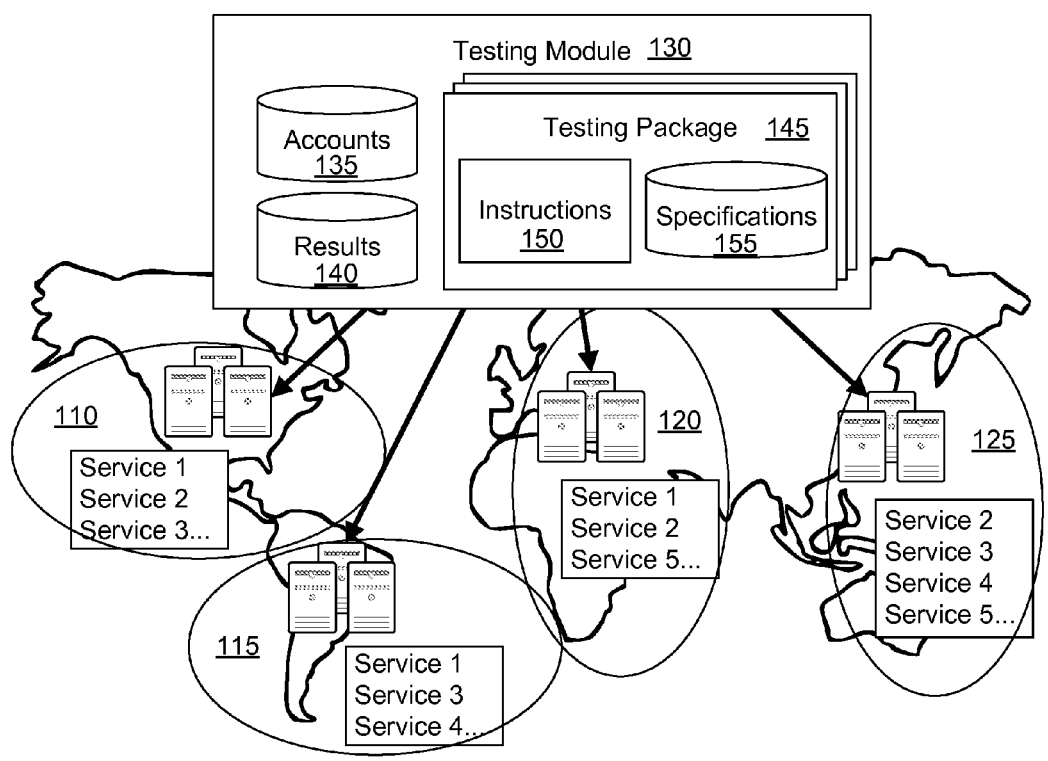

Reference will now be made to FIG. 1B. Rather than rely on customers to execute applications or otherwise use services that may test the configuration and functionality of computing resources in a region, reference may be made to testing packages which are made available to the customers regarding the available services for a region. Specifically, the service provider may provide testing packages to the customers in the form of documentation describing basic services and operations for usage of the computing resources in that region. For the present technology, the service provider may create tests for each service and operation in the testing packages. The tests may be automated tests that test the services and operations described in the testing packages. Specifically, a different test may be created for each service and/or operation.

FIG. 1B illustrates a testing module 130 to implement these tests. The testing module 130 may be executed from any one or more of the regions 110-125 to test any one or more of the regions. The testing module 130 may test regions other than a region from which the testing module 130 is executed or may test a same region at which the testing module is executed. The testing module 130 may, for example, use regression testing and comparative temporal testing to perform the tests. Examples of the types of testing may include: sending a request for a service and determining that a result was received from the service; pinging a service to make sure it is responding; sending a query to a data cluster; retrieving data from a virtual data store; launching an application on a computing instance, etc.

The testing module 130 may identify each of the services for the different regions in order to identify what to test. This identification of the services may be provided, for example, in testing packages for the computing resources at the region being tested or by querying the computing resources for the services offered. The testing module 130 may test the testing packages 145 using test instructions 150 and specifications 155 against which to test. Results from tests for the regions may be logged and stored in a results data store 140. The testing module 130 may use a testing package 145 to test each service available for a region to ensure proper operation. For example, the testing module 130 may examine computing resources instantiated or used through the tests to ensure proper creation/instantiation and operation. The testing instructions may include, for example, scripts coded in a suitable language to test characteristics of a performance of a service on computing resources.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The testing module 130 may test for absolute and relative results. Specifically, the metrics and other data logged during the tests may be used to determine whether, for example, a particular operation was successful or failed. Pass or fail may be an example of an absolute result. A determination of pass or fail may be made, for example, based on occurrence of an error, time-out of an operation, return of an incorrect result or the like. For example, the testing module may send incorrect information to validate that the correct failure/error messages are returned by the service. A relative test result may be a result which further defines the pass or fail result. For example, while an operation may be successful, a metric indicating how much time elapsed before completion of the operation may be a relative test result. Thus, in addition to testing that computing resources are functioning, the testing module may test how well the computing resources function.

The testing packages 145 may include specifications 155 defining aspects of expected performance characteristics. For example, the specifications 155 may define that completion of an operation should not take longer than 60 seconds. When the results 140 are returned from the computing resources in a region, a determination may be made as to whether the operation completed and whether the completion was within the defined 60 second window. If yes, then the computing resources may be determined to be operating properly. However, if no, then the computing resources may be flagged for review in order to identify the cause of the issue and to correct the issue.

The present technology may ensure that adequate and similar computing resource performance is available across the various regions. The results from different regions may be compared by the testing module to determine whether performance for similar services on similar hardware is similar within a predetermined acceptable degree or margin of error. The present technology may be utilized to test and characterize computing resources that are isolated from other computing resources or which are connected to other computing resources. Some clusters of computing instances, for example, may have different characteristics than other clusters of computing instances. For example, different clusters of computing instances in different regions may use different computing hardware or resources, have different capabilities, have different interdependencies with hardware/services/etc., and so forth. The specifications data store 155 may include expected capabilities for the different computing resources. The results data store 140 may include actual capabilities for the different computing resources. The expected and actual capabilities may be compared to determine whether the computing resources are performing satisfactorily.

Customers may typically use customer credentials to access an account associated with services provided by the service provider. The service provider may have a pool of accounts of different types. In other words, the accounts may have different limitations, different settings, may have been created at different times and so forth. The accounts may be dummy accounts, unused customer accounts, live customer accounts or any variety of different types of accounts. The service provider may use a selection service to select accounts from the pool of accounts, or rather from an accounts data store 135. The selection service may, for example, be part of the testing module 130. Some accounts may utilize different identity management technologies, some may be related to an account management system specific to certain regions which may be separate from and unconnected to the internet (e.g., a protected government network). Different service tools may be available to different accounts, for different regions or different services.

After using an account for testing purposes, the account may be returned to an original condition by the testing module 130 (if any changes were made to the account during testing) and placed back in the account pool in the accounts data store 135. A test for one or more services may be performed multiple times with multiple different accounts. The multiple different accounts may be used across multiple services. Testing multiple different accounts across multiple services may help ensure that account specific settings do not interfere with test results to return inaccurate or atypical results. The different accounts with different settings or variable configurations may provide different results from one another. A goal may be to have the results from each of the tests satisfy the specifications. An additional goal may be to have the results from different regions within a predetermined margin of error or difference from one another.

Among the accounts, there may be accounts which have non-standard settings, configurations or other parameters. For example, accounts may be intentionally modified in some way by an administrator in order to test services for a specific account permutation. Various account types may be available in the accounts data store 135. For example, the accounts data store may include legacy accounts with classic or legacy functionality, accounts with VPC (Virtual Private Cloud) access, accounts with compute service access, accounts with VPC and compute service access, accounts whitelisted for beta testing or other special services, and so forth. Most accounts may generally have access to most services, but some older accounts may have limits not present in newer accounts, or some region accounts may have limits not present in other region accounts. The accounts data store may include identifiers appended to accounts in order to identify accounts with different configurations, restrictions and the like. The identifier may be used to sort or group accounts in order to more easily select accounts representing a wide variety of configurations.

Because services and computing resources in a service provider environment frequently change and improve with new technologies, hardware and so forth, testing using varying types of accounts or varying account configurations, as described herein, may be valuable. In one example, the testing may be a cross-service integration test to test integration of services with one another, particularly after a change or upgrade to any particular service. As an example, a MapReduce service may also utilize storage and compute services. A customer may have data in a storage service which is accessed and processed by the compute service. The compute service may output new data to a new storage bucket in the storage service. The MapReduce service may perform filtering, sorting, summarization, etc. of data output from the compute service and stored by the storage service. Thus, the effective interaction between the MapReduce service and the storage service maybe tested.

The testing module 130 may analyze results from tests to identify potential issues. For example, the testing module may identify that in one particular region a cluster of computing instances failed 5% of the time due to certain types of software incompatibilities. Some issues may be identified by analyzing the result to identify commonalities and differences. For example, when a certain computing instance type is used the MapReduce service may fail, but with other computing instance types the MapReduce service does not fail. As another example, a VPC may use resources that had previously been available for MapReduce services in a region, and those resources may be identified as causing MapReduce issues. Thus, in addition to testing the services themselves, cross-service integration may be tested to verify that functioning services integrate well together. Service and cross-service testing, including testing with various different accounts enables testing of a variety of permutations, platforms, services, and so forth. As a result, the performance levels expected by customers may be met because problems may be identified in advance and may be rectified. Also, any expanded or reduced features or services, such as beta programs, early access and the like can be verified to work as intended.

The present technology may utilize one or more monitoring services to log conditions for computing resources and services. The testing module 130 may regularly run the tests and the monitoring services may monitor the performance of the test and collect metrics. When the metrics collected are unexpected or when the testing module identifies an issue, an alarm may provide a notification to an administrator. For example, an alarm may generate the notification when performance is outside of the test specifications and/or outside of an acceptable deviation from performance in other regions. As another example, an alarm may provide a notification when unapproved changes to computing resources or services are made. An example alarm may provide a notification for when the same operation is discovered to be variable in time length to complete across regions. Specifically, if the testing module 130 attempts to apply a policy, such as to describe permissions for a storage bucket and in some regions the operations is performed within a few seconds and in other regions the operation takes 15 seconds, an alarm may notify an administrator of the discrepancy. The testing package 145 may define that the operation may not take more than 60 seconds to complete for any region, and an alarm may go off when the operation takes more than 60 seconds for a region.

Figure 2:
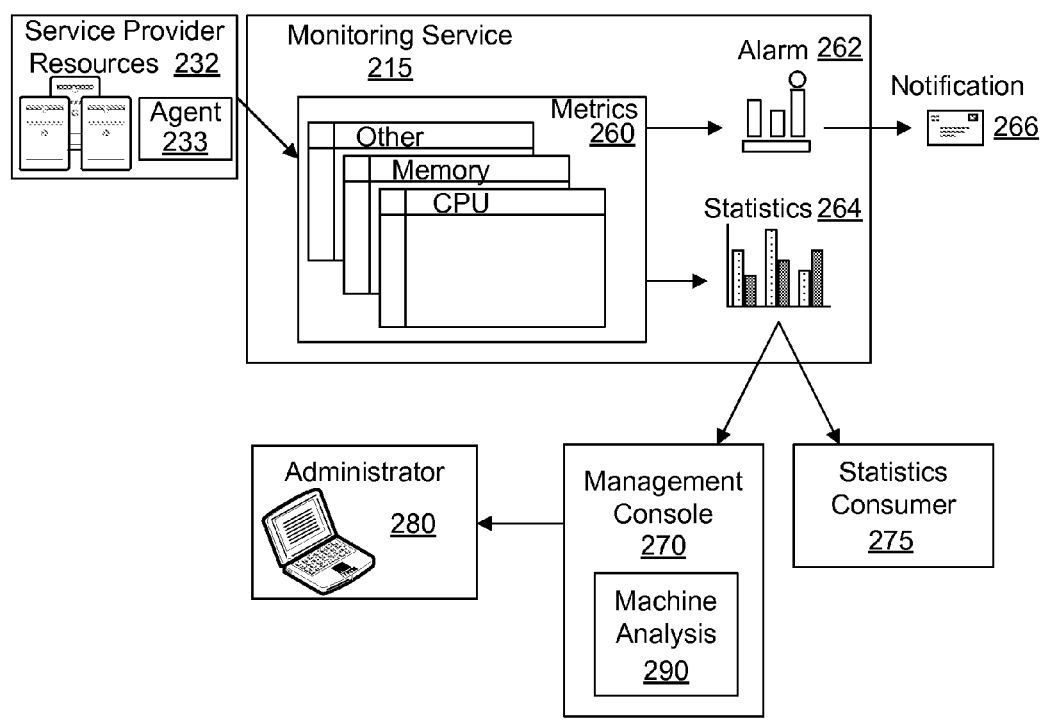
FIG. 2 illustrates an example monitoring service for monitoring computing resource testing in accordance with an example of the present technology.

FIG. 2 illustrates a system including a monitoring service 215 for monitoring performance of the tests. Specifically, FIG. 2 illustrates a monitoring service 215 in a service provider environment that is configured to monitor service provider resources 232, such as computing instances, optionally using an agent 233, by monitoring API (Application Programming Interface) calls, computing instance output, service listeners or senders, or any other suitable method. The monitoring service 215 may enable monitoring of service provider resources 232 as events occur, including, for example, monitoring: computing instances, storage volumes, elastic load balancers, relational database service database instances and so forth. Metrics 260 such as CPU utilization, latency, and request counts may be provided automatically for the resources. Administrators 280 may further request custom application and system metrics, such as memory usage, transaction volumes, or error rates, which may be monitored in the monitoring service 215. With the monitoring service 215, administrators 280 may access up-to-the-minute statistics 264, view graphs, and set alarms 262 for metric data. The monitoring service 215 functionality may be accessible to the administrator 280 via API, command-line tools, an SDK (Software Development Kit), and/or a management console 270.

The management console 270 may be used by the administrator 280 to view statistics for the collected metrics. The monitoring service 215 may provide an alarm service 262 to send notifications 266 or to activate triggers to automatically flag problems with the resources being monitored based on rules or specifications that are defined in the testing package by the administrator 280. For example, the administrator 280 may wish to monitor CPU usage and disk reads and writes, and then use this data to determine whether to launch additional computing instances or replace current computing instances with a different instance type to manage increased load. The alarm service 262 may provide triggers to stop, start, or terminate applications, processes, computing instances, and so forth when certain criteria meeting predefined rules are met. In addition, the alarms may initiate notification actions.

The monitoring service 215 may include a metrics repository or data store from which administrators 280 or other statistics consumers 275 may retrieve statistics 264 based on those metrics 260. The metrics 260 may be used to calculate statistics 264 and present the data graphically in the management console 270. The management console 270 may enable an administrator 280 to view graphs and statistics for any of the collected metrics and view a quick overview of alarms and monitored resources in one location. Once metrics 260 are uploaded to the monitoring service 215, the metrics 260 may be visualized in the management console 270, or the administrator 280 may define and set alarms 262.

The management console 270 may provide machine analysis 290 of statistics 264 and/or metrics received from the monitoring service 215. For example, business rules, scripts, machine learning and the like may be used to analyze the statistics 264 for the presence of known or predefined issues, resource usage beyond a predetermined threshold and so forth to identify issues, problems, etc. These may be flagged in the management console 270 for the administrator 280 to review.

It should be appreciated that although certain implementations disclosed herein are described in the context of computing instances or virtual machines, other types of computing configurations or service can be utilized with the architectures and technologies disclosed herein. For instance, the technologies disclosed herein can be utilized directly with physical hardware storage resources or virtual storage resources, hardware data communications (i.e., networking) resources, I/O hardware, and with other types of computing resources.

Services provided through service provider resources 232 in the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

When a computing instance is launched, the instance type that is specified determines the real hardware or virtualized hardware of the host computer used for the computing instance. Each computing instance type may typically offer different compute, memory, and storage capabilities. The computing instance type may be selected based on the requirements of the application or software that is to run on the computing instance. Each computing instance may be provided with a consistent and predictable amount of CPU (Central Processing Unit) capacity, regardless of the underlying hardware. Some resources of the host computer, such as CPU, memory, and instance storage, may be dedicated to a particular computing instance. Other resources of the host computer, such as the network and the local disk subsystem, may be shared among computing instances. If each computing instance on a host computer tries to use as much of one of these shared resources as possible, each receives an equal share of that resource. However, when a resource is under-utilized, a computing instance may be allowed to consume a higher share of that resource while the under-utilized resource is available.

The testing module and/or monitoring service may be offered or provided as a service to service providers. The technology may operate as an external platform service tool for testing a service provider environment. For example, the technology may monitor compliance metrics or specifications for service level agreements (SLAs). The technology may be used to characterize transit or communications between virutalized computing environments in separate geographical regions to help customers understand the capabilities of the internet for the customer's own business practices. The technology may assist customers in visualizing how services may operate in a service provider environment.

Each service provider region may "talk" to each other region to generate telemetry data. The technology may be deployed to characterize behavior between computing environments. Telemetry test agents may be dispersed across the internet—on televisions, phones, tablets, appliances, etc., and the telemetry test agents may be located on such devices at customer premises. Customers may opt-in to metric collection or may receive a discount on products or services for opting in. Telemetry data may be useful, for example, for a wide variety of purposes. In one example, telemetry may be used to: identify discrepancies between stated network performance and delivered network performance, identify latency for video on demand, identify how streaming data flows flow across a network (including ingress and egress points, etc.) using network paths, and so forth.

As used herein, the term "measurement" may indicate an observed value with a set of attributes. For example, a measurement may include a name, a set of dimensions, a namespace, a unit, and/or a timestamp among possibly other (or fewer) characteristics. As used herein, the term "dimension" may be used to specify how a measurement can be aggregated, such as by InstanceID, InstanceType, Availability Zone, or other factors (described in detail below). As used herein, a namespace may identify the service that collected the measurement. Furthermore, as used herein, a metric may include an aggregation of measurements data.

A user may specify one or more metrics that define how the various measurements are to be aggregated. For instance, metrics data may include the same attributes as the measurements data and may be the aggregate of some or all measurements with a given name, within a given period of time. As another example, a metric may include an aggregation of some or all of the measurements in a particular namespace, or another metric can include an aggregation of some or all measurements having a particular InstanceID, etc. A metric may, in some embodiments, be an aggregation of other metrics. As a result of this flexibility, in certain embodiments, metrics may include a variety of dimensions based on the preferences of the user.

The metrics may be collected, aggregated, analyzed, organized, etc. by a testing module, such as the testing module 130 of FIG. 1B. The metrics may be used to determine absolute and relative performance characteristics of the computing resources specific to the region, and optionally as compared with other regions, and optionally with consideration of inter-service performance characteristics as will be described in additional detail later.

Figure 3:
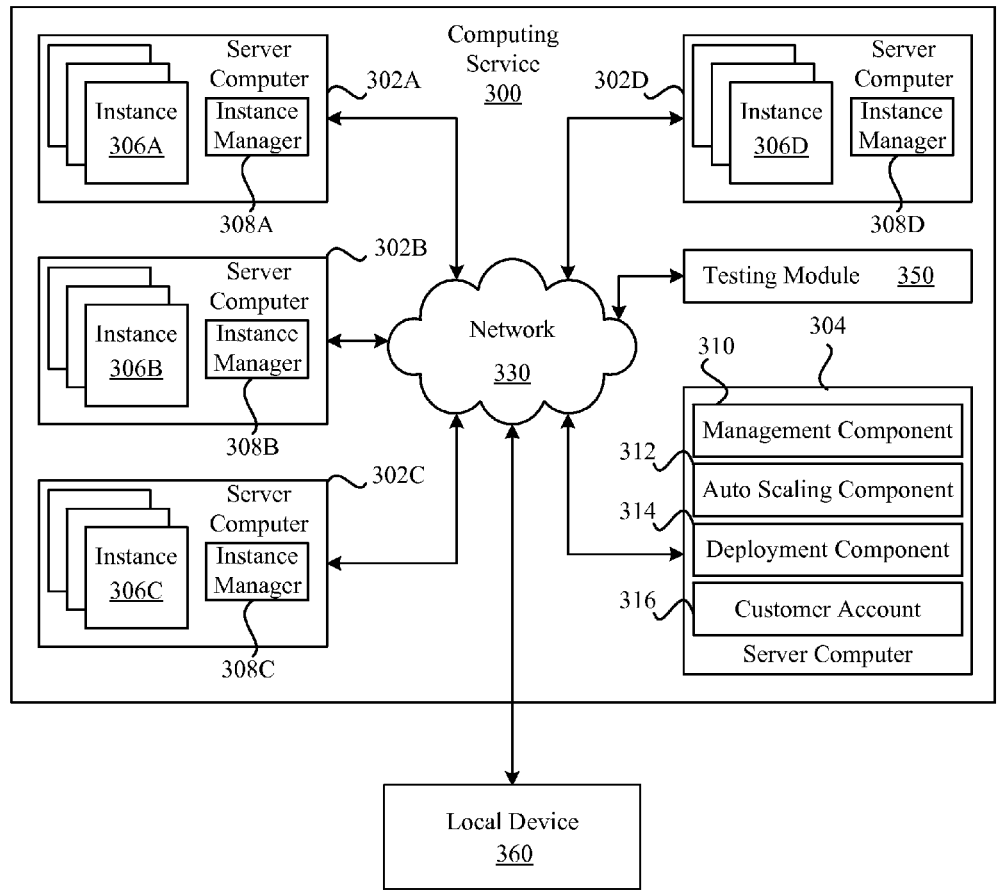
FIG. 3 is a schematic overview of a virtual computing resource provider in accordance with an example of the present technology.

FIG. 3 illustrates how components of a data center may function as a computing service 300 in a service provider environment. As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of sub-components executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

A testing module 350 may be utilized to schedule or perform tests and analyze results of the tests. Metrics may be collected, aggregated, analyzed, organized, etc. by the testing module 350. The testing module may determine how well the instances 306 or other virtualized computing services tested may perform relative to one another in a same region, across different regions, and so forth as has been and will be described.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
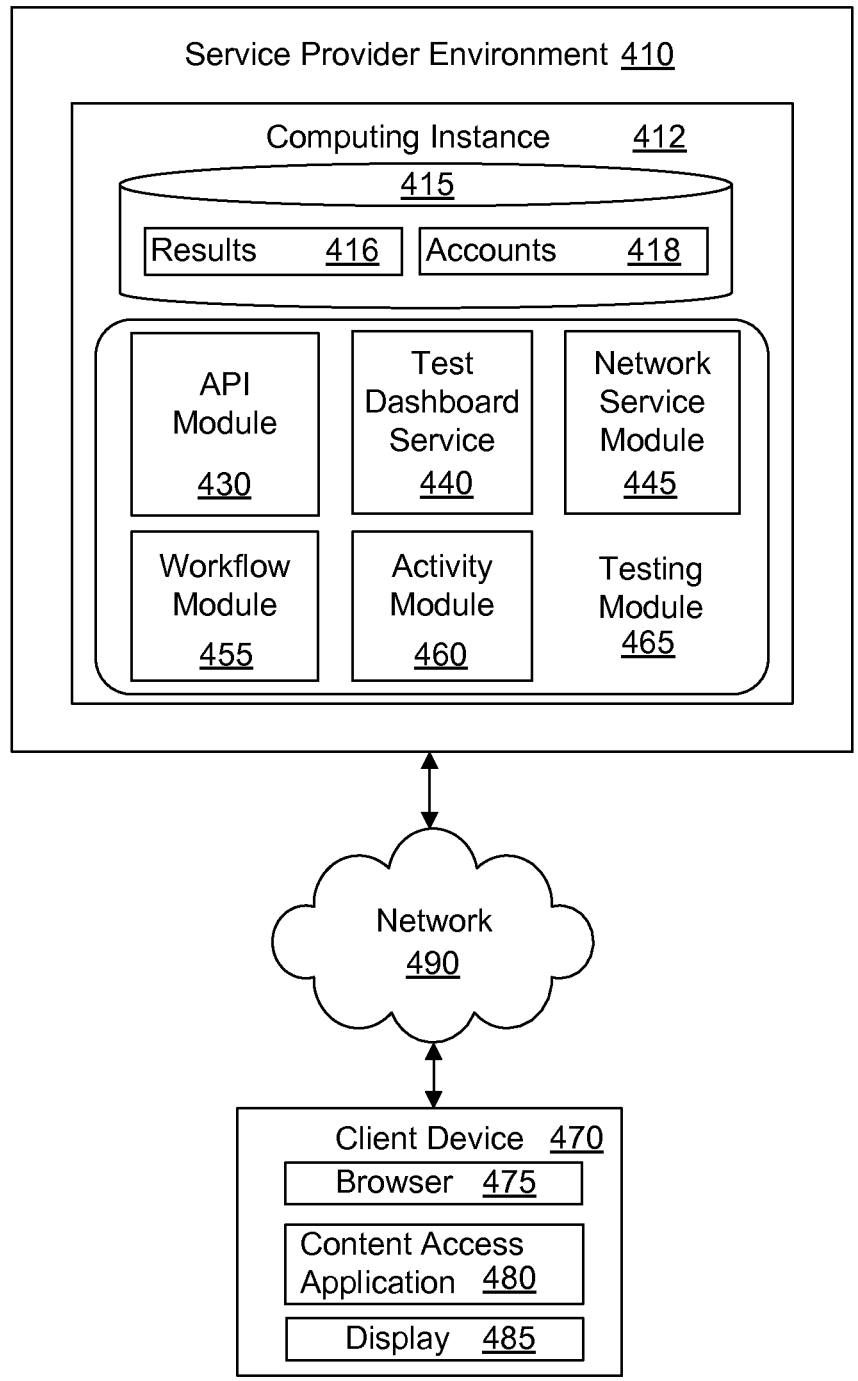
FIG. 4 is a block diagram of a system for testing computing resources in accordance with an example of the present technology.

Referring now to FIG. 4, a block diagram of a testing system for testing computing resources is illustrated in accordance with an example of the present technology. The system may be implemented using one or more computing devices in a service provider environment 410, such as a server as an example computing device, as well as client devices 470 that may be accessible across a network 490. The system may include a data store 415 and a number of modules 430, 440, 445, 455, 460 for storing and processing data to be used in testing which may be implemented on a computing instance 412 in the service provider environment 410.

Computing services offered by a service provider environment 410, may include a computing device that executes one or more servers or computing instances. A user may operate one or more servers to execute an operating system and computing applications as a service. A user may create, launch, and terminate servers as desired. The user may have some control over the geographical location or region of servers or clusters of servers to optimize latency and provide high levels of redundancy.

The user may access and manage the one or more servers over a network connection, such as a connection through the Internet, for example. The user may perform various operations on the servers such as adding, updating, modifying, deleting or other otherwise maintaining software or services on the servers. These operations may be performed by the user from the client device 470.

The server(s) may be a virtual computing instance as previously explained, and the virtual computing instance may be implemented using a virtualization computing environment in a service provider environment 410, which may include a virtual distributed computing system with a virtualization layer executing on a hardware substrate layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer. This computing service architecture that supports computing instances is illustrated in more detail in FIG. 3.

The system may include a command line module or an API module 430. The API module 430 may provide an interface for interfacing with computing resources in the service provider environment 410. The API interface may be used for controlling the computing resources, automating operations on the computing resources, transferring data between computing resources and other management operations, including testing. The API module 430 may be an API tool used to launch the tests to test the computing resources. Tests may be executed by obtaining account credentials and instructions to run a test in a region and return the results to be stored in a results data store 415.

The system may also include a test dashboard service 440. The dashboard service may provide a dashboard for an administrator, such as at client device 470, to access via a network 490, such as the internet. The test dashboard service 440 may access data in the results data store 415 to display various information such as the last run test, a status of one or more tests, the test output or results, and/or any other statistical information associated with the test. The test dashboard service 440 may be a dashboard module, or a reporting service, an API or the like. The results data store 415 may thus include more than the bare results, but also the context of the results. In other words, the results data store 415 may include data relating to when the test was performed, what the status of the test was, how the test compared to other geographical regions, and so forth.

The system may include a network service module 445. The network service module 445 may enable access to the functionality of a command line module or API module 430 using a graphical user interface (GUI) to enable a user for interfacing with test commands, workflows, results, and so forth. In other words, the network service module 445 makes a command line interface of a command line module accessible and usable via a network interface over a network 490, such as from client device 470. The network service module 445 may provide the credentials to the command line module or API module 430 and instruct the API module 430 to initiate the test. The test may be part of a workflow that is run by two additional modules—the workflow module 455 and the activity module 460. The workflow module 455 may be configured to make decisions as to how the workflow is to proceed, such as what services to test, how to test the services, in what order to test services, what inter-service integration tests are to be performed with which other services and so forth. The activity module 460 may run the test, using the command line interface of the API module 430, based on the decisions made by the workflow module 455.

As an example use case, if a test is run five times in a past day, the test is initiated each time by the network service module 445 and executed by the activity module 460 via the API module 430 and based on decisions from the workflow module 455. The activity module 460 executes the test using the command line tool. The results of the tests may be stored in the results data store 415 by the API module 430 via the activity module 460. The activity module 460 may also be configured to compare results of the test from a plurality of different geographic regions to evaluate performance of the computing resources in at least one of the plurality of geographic regions relative to at least one other of the plurality of geographic regions. An account selected from an accounts data store 418 may be returned to the accounts data store after completion of the test across multiple services in a region or across a service in multiple regions.

The network service module 445 may be configured to select and retrieve the account credentials from the account data store for the test and to return the account credentials to the account data store at a conclusion of the test. The network service module 445 may be further configured to select different account credentials for a different type of account for a second test.

The API module 430, test dashboard service 440, network service module 445, workflow module 455 and activity module 460 may form the testing module 465, also described previously with respect to FIG. 1B. The testing module 465 may test a service provider's own computing resources and services or may be used to provide testing of the computing resources for a plurality of independent, third-party networked computing resources.

Client devices 470 may access data, content pages, services and so forth via a computing instance or server in a computing service provider environment 410 or one or more computing instances or clusters, over a network 490. Example client devices 470 may include, but are not limited to, a desktop computer, a laptop, a tablet, a mobile device, a television, a cell phone, a smart phone, a hand held messaging device, heads up display (HUD) glasses or any device with a display 485 that may receive and present the message content.

The system may be implemented across one or more computing device(s) connected via a network 490. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content served up by the computing device and/or other servers. The content access application 480 may be executed to obtain and render for display content features from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. The client device may be configured to execute applications beyond those mentioned above, such as, for example, mobile applications, email applications, instant message applications and/or other applications. Users at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module.

Such APIs may also allow third parties to interface with the module and make requests and receive output from the modules.

Figure 5:
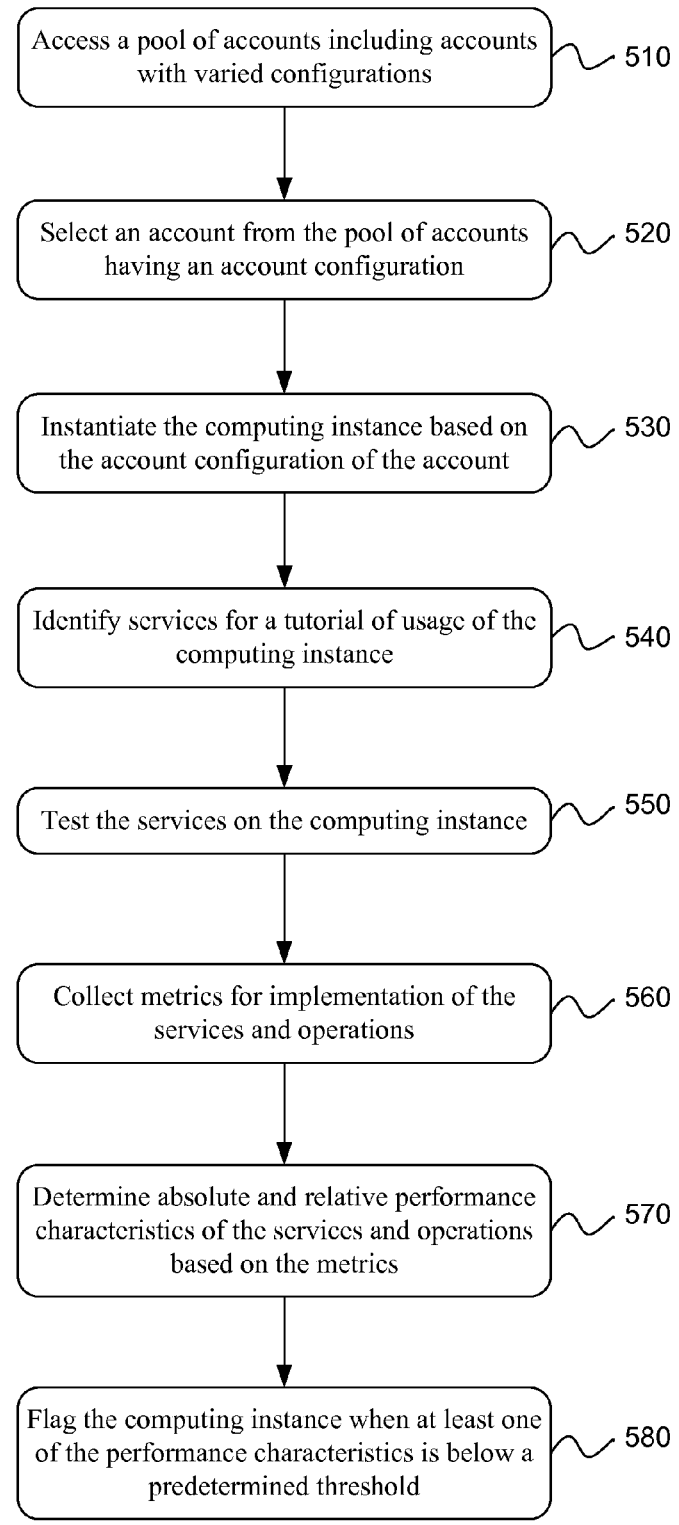
FIGS. 5-6 are flow diagrams for methods of testing computing resources in accordance with examples of the present technology.
Figure 6:
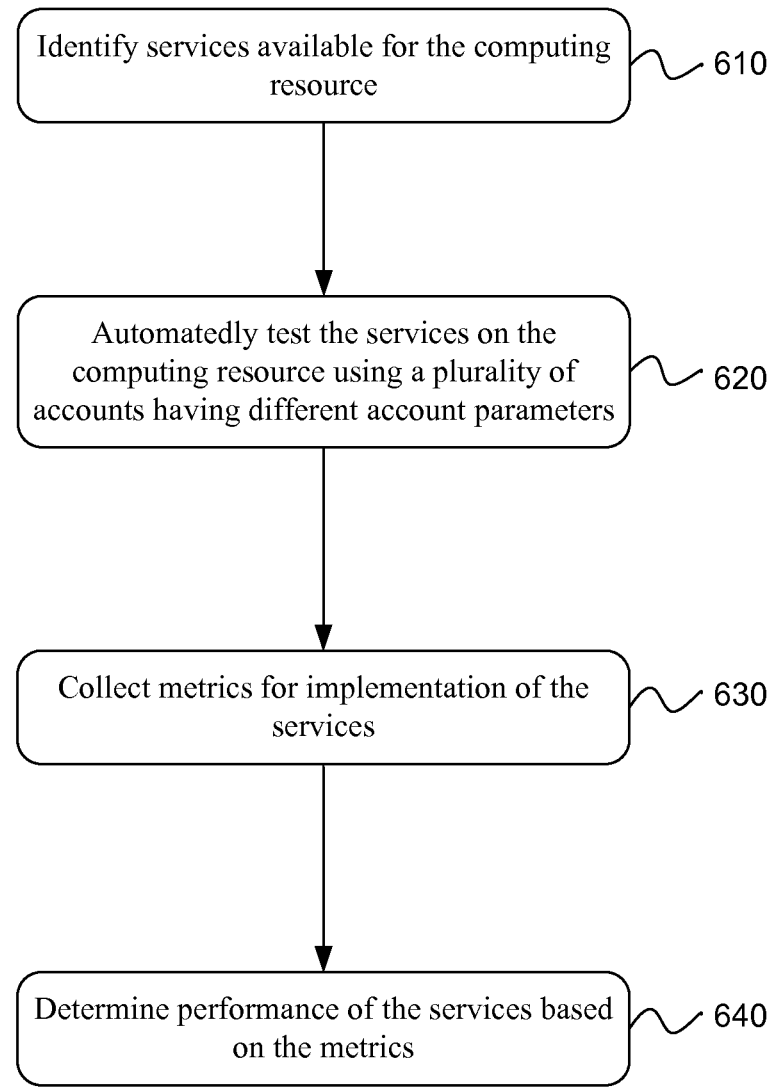

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for testing services on computing instances. The method may include accessing 510 a pool of accounts, including accounts with varied configurations. An account may be selected 520 from the pool of accounts. The account may have an account configuration. The account may be selected based on the account configuration and may be chosen over another account as a result of a different configuration from other accounts. The method may include instantiating 530 the computing instance using the account configuration of the selected account. The method may identify 540 services defined by a testing package for usage of the computing instance. In other words, the functions or services that a service provider expects a customer to understand or potentially use may be identified. The testing package may be a testing regime, an analysis schedule or the like.

The services on the computing instance may then be tested 550. Metrics associated with testing of the services may be collected 560. Based on the metrics, absolute and relative performance characteristics of the services may be determined 570. For example, an absolute characteristic may be a verification of an error condition. Specifically, the testing package may execute a script or run a test or the like which is intended to cause an error condition. The absolute characteristic tested is whether the error condition was returned as expected. The computing instance may be flagged 580 when at least one of the performance characteristics is below, above or otherwise outside a predetermined threshold or predefined constraint. After the test has been completed, the method may include terminating the computing instance and return the account to the pool of accounts.

The method may further include comparing at least one of the performance characteristics to a performance characteristic for a computing instance in a different geographic region. The performance characteristic of the computing instance in the different geographic region may represent the predetermined threshold. In other words, the performance characteristic of computing instances in other regions may be a standard or baseline against which performance of computing instances in the presently tested region are compared against. In another example, the predetermined threshold may be defined by the testing package. In another example, the performance characteristic may be tested against thresholds defined by the testing package and the different geographic region.

The method may further include testing the computing instance on a periodic basis and storing the performance characteristics for each test in a data store for comparison to past performance characteristics and for comparison to performance characteristics of computing instances in different geographic regions. The periodic basis may be a regular periodic basis, such as to occur at a set time on set days, or may be based on periodicity of software, hardware, service or other changes.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for testing computing resources. The method may include identifying 610 services available for the computing resource and automatically testing 620 the services on the computing resource using a plurality of accounts having varying account parameters. Metrics may be collected 630 from the implementation of the services. Performance of the services on the computing resources may be determined 640 based on the metrics. Based on the performance, a determination may be made as to whether the computing resources are able to properly execute the services. The method may include testing a plurality of services or functionality for the computing resources using each of the plurality of accounts to test for different configurations that a customer may have when using the computing resources. Results of the testing may be published proactively to consumers or publicly (but anonymously) to inform customers of a status of the services or computing resources as well as any corrective measures that are being taken or will be taken. Thus, a feedback loop may be provided to provide information to customers or to receive information from customers regarding the system status or corrective measures needed.

In one example, the computing resource has a first configuration associated with a first one of the accounts and the method further includes instantiating the computing resource with a second configuration associated with a second one of the accounts. Then the services may be automatically tested, and metrics may be collected to determine the performance for the computing resource with the second configuration. A difference between the first and second configurations may be an expansion or reduction to the services or operations available for the computing resource. In other words, one account may have certain services available based on factors such as when or where the account was created while another account may have fewer or greater services available based on when or where the other account was created.

The method may further include enabling the test through a network-based service configured to access a command-line tool to run the test and return the performance characteristics. An absolute performance characteristic may be an indication of whether an operation successfully completed. A relative performance characteristic may be a statistic related to completion or failure of the operation to provide insight into details of the completion or failure.

The test may be a cross-service integration test. For example, the computing resource may be a computing instance and the method may test integration of the computing instance for a compute service with a different type of service, such as a storage service. Metrics related to the integration may be monitored and reported. For example, the integration of a computing instance with a virtualized block storage device may be tested.

The method may include flagging the computing resource when at least one of the performance characteristics is below a predetermined threshold. Flagged computing resources in a geographic region may be evaluated to determine whether the performance characteristics below the predetermined threshold are related to the geographic region or the hardware used to provide the computing resources in the geographic region. A dashboard may display various information, such as the performance characteristics, flagged issues, a last run test, a status of a current test, test output, test statistics and so forth.

Figure 7:
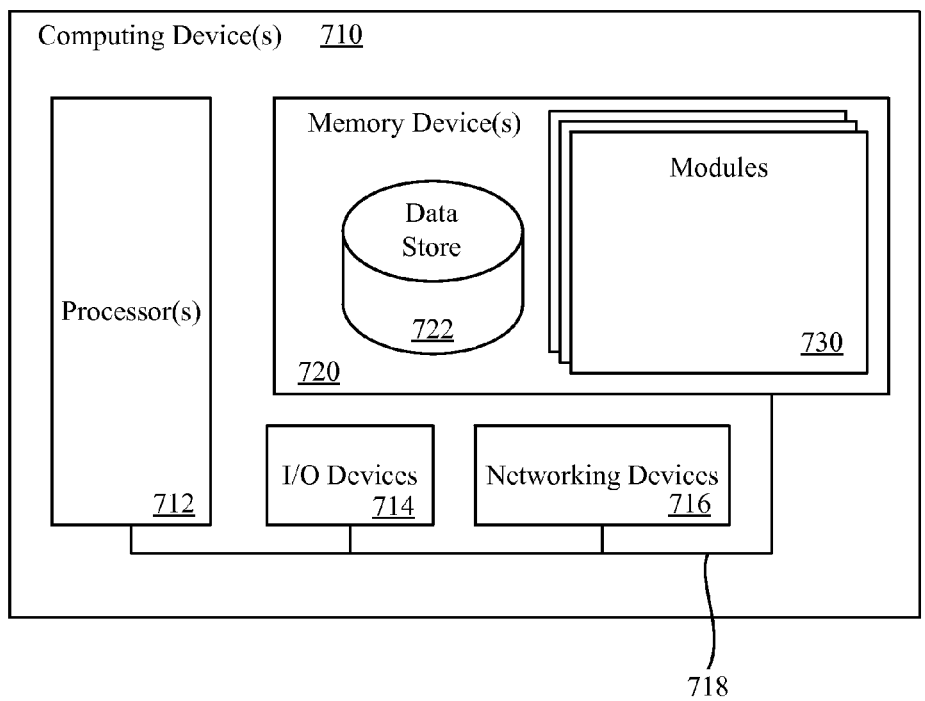
FIG. 7 is a block diagram of a computing system for testing computing resources in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computing device that is configured to test a virtualized service in a service provider environment, comprising:

a processor;

a memory in electronic communication with the processor;

instructions stored in the memory, the instructions being executable by the processor to:

access a pool of service accounts including service accounts for the service provider environment, the service accounts having a plurality of distinct configurations;

select a service account from the pool of service accounts having an account configuration;

instantiate the virtualized service in the service provider environment based on the account configuration of the service account;

identify services enumerated in a testing regime for usage of the virtualized service;

initiate a test over a network connection using an application programming interface (API);

test the services on the virtualized service in a plurality of regions;

display a test status and a test history for the test in the plurality of regions;

collect metrics for testing of the services in the plurality of regions;

determine absolute and relative performance characteristics of the services across the plurality of regions based on the metrics;

compare at least one of the absolute or relative performance characteristics for one of the plurality of regions to the absolute or relative performance characteristic for a different region; and provide a notification when at least one of the absolute or relative performance characteristics is outside a predetermined threshold for the one of the plurality of regions, the predetermined threshold being relative to the absolute or relative performance characteristics for the different region.

2. The computing device of claim 1, wherein the service accounts are customer accounts.

3. The computing device of claim 1, further configured to terminate the virtualized service and return the service account to the pool of service accounts.

4. The computing device of claim 1, further configured to test the virtualized service on a periodic basis and store the performance characteristics for each test in a data store for comparison to past performance characteristics and for comparison to performance characteristics of virtualized services in different geographic regions.

5. A computer-implemented method to test a computing resource in a service provider environment, comprising:

provide a computing resource in the service provider environment based on an account configuration of a service account selected from a pool of service accounts, the service accounts having a plurality of distinct configurations;

identifying services available in the service provider environment for the computing resource;

initiating the test over a network connection using an application programming interface (API);

testing the services on the computing resource across a plurality of regions using a plurality of service accounts for the service provider environment, the service accounts having varying account parameters;

sending a test status and a test history for the test in the plurality of regions for display;

collecting metrics from the testing of the services, using a processor;

determining comparative performance of the services in the plurality of regions based on the metrics, using the processor, the comparative performance including absolute performance and relative performance; and providing a notification when the comparative performance for at least one of the plurality of regions is outside a predetermined constraint relative to the comparative performance for another of the at least one of the plurality of regions.

6. The method of claim 5, wherein the computing resource has a first configuration associated with a first service account of the service accounts, the method further comprising instantiating the computing resource with a second configuration associated with a second one of the service accounts, automatically testing the services using a testing package, collecting metrics and determining the performance for the computing resource with the second configuration.

7. The method of claim 6, wherein a difference between the first and second configurations is an expansion or reduction to the services or operations available for the computing resource.

8. The method of claim 5, wherein an absolute performance characteristic is an indication of whether an operation successfully completed, and wherein a relative performance characteristic is a statistic related processing of the operation.

9. The method of claim 5, wherein the test is a cross-service integration test and the computing resource is a computing instance, the method further comprising testing integration of the computing instance for a compute service with a different type of service, and monitoring metrics related to the integration.

10. The method of claim 5, further comprising testing a plurality of services for the computing resources using each of the plurality of service accounts.

11. The method of claim 5, further comprising testing the services for the computing resources in each of the plurality of regions using a same service account.

12. The method of claim 1, wherein the plurality of regions are distinct geographic regions, the method further comprising evaluating computing resources in the at least one of the plurality of geographic regions relative to the different region to determine whether the at least one performance characteristic is outside the predetermined threshold is related to the geographic region.

13. A non-transitory computer-readable medium comprising computer-executable instructions which, when executed by a processor, implement a system, comprising:

a testing module configured to identify services enumerated in a testing regime for usage of computing resources;

an application programming interface (API) module configured to provide an interface to initiate a test of the services on the computing resources in a plurality of geographic regions;

a monitoring service configured to collect metrics as results from the test of the services;

a dashboard service configured to provide for display a test status and a test history for the test in the plurality of geographic regions;

a network service module configured to provide a graphical user interface with the API module to initiate the test over a network connection, the network service module being further configured to select and retrieve account credentials from an account data store for the test, different account credentials being associated with different types of accounts; and an activity module configured to compare the results of the test of the computing resources from the plurality of geographic regions to evaluate performance of the computing resources in at least one of the plurality of geographic regions relative to at least one other of the plurality of geographic regions, the performance including absolute performance and relative performance, the activity module further configured to provide a notification when the results of the test for the at least one of the plurality of geographic regions are outside a predetermined performance threshold relative to the results for the at least one other of the plurality of geographic regions.

14. The computer-readable medium of claim 13, wherein the network service module is further configured to input account credentials into a command line tool to initiate the test.

15. The computer-readable medium of claim 13, further comprising a workflow module configured to decide on a workflow defining how to proceed with the test based on services available via the computing resources at a selected one of the plurality of geographic regions.

16. The computer-readable medium of claim 15, wherein the activity module is further configured to perform the test based on the workflow and using the API module.

17. The computer-readable medium of claim 13, wherein the network service module is further configured to return the account credentials to the account data store at a conclusion of the test, the network service module being further configured to select different account credentials for a different type of account for a second test.

18. The computer-readable medium of claim 13, wherein the system is configured to provide testing of the computing resources for a plurality of independent, third-party networked computing resources as a service.

* * * * *